United States Patent [19]
Smith

[11] 3,873,659
[45] Mar. 25, 1975

[54] METHOD FOR FORMING ARTICLES FROM PLASTIC SHEET MATERIAL

[75] Inventor: Robert J. Smith, Indianapolis, Ind.

[73] Assignee: Philco-Ford Corporation, Blue Bell, Pa.

[22] Filed: Aug. 1, 1973

[21] Appl. No.: 384,636

[52] U.S. Cl. .................. 264/89, 264/92, 264/93, 425/388
[51] Int. Cl. ............................................. B29c 17/04
[58] Field of Search ............ 264/89, 90, 92, 93, 94, 264/96, 98, 292; 425/326, 387, 388

[56] References Cited
UNITED STATES PATENTS
3,781,394  12/1973  Houghton ........................ 264/92 X Primary Examiner—Jan H. Silbaugh
Attorney, Agent, or Firm—Robert D. Sanborn

[57] ABSTRACT

A vacuum-forming method for making a pair of adjacent compartment liners from a single sheet of thermoplastic material. A sheet of thermoplastic material is disposed to extend over the molds and is heated to a pliable, softened state while the molds are held in pivoted positions, in which the confronting surfaces are substantially spaced from one another, and while the table structure is held in upwardly tilted position. The pliable sheet of thermoplastic material is then caused to billow away from the pivoted and tilted molds, whereupon mold assist-plugs and the molds are then moved, relatively, toward one another, to urge the sheet to generally close conformity with the molds. While the sheet of thermoplastic material is still pliable, the frame structure is pivoted to cause confronting adjacent wall portions of the mold to move toward one another and assume a closely spaced relation, while the table structure is moved from its tilted position to a substantially horizontal position. Air entrapped between the pliable sheet and the walls of the molds is then evacuated through a number of small ports of vents in the walls, thereby forming the desired liners over the molds. The liners are then cooled and stripped as a unit from the molds.

4 Claims, 7 Drawing Figures

METHOD FOR FORMING ARTICLES FROM PLASTIC SHEET MATERIAL

CROSS REFERENCE TO RELATED DISCLOSURE

This invention is directed to improvements in the method and apparatus disclosed and claimed in the copending application of Norman F. Houghton, Ser. No. 235,968 filed Mar. 20, 1972, now Pat. No. 3,781,394 and assigned to the assignee of the present invention.

BACKGROUND OF THE INVENTION

This invention relates to the formation of articles from sheets of thermoplastic material, and is more particularly concerned with an improved method for forming deep-drawn shapes, for example food storage compartment liners for refrigerator cabinets.

In producing articles of the aforementioned type, it is known to bring an assist-plug into contact with a heat-softened, pliable sheet of thermoplastic material to urge portions thereof onto adjacent forming molds, after which the material is subjected to a vacuum, while in its pliable state to achieve a desired shape. In the fabrication of liners for dual-compartment refrigerators, it has been desired to mold the liners from a single sheet, but it has been found difficult to achieve uniform thickness of the sheet in the region of the adjacent walls of the liners, due to the close spacing therebetween, and further to control the thickness of the sheet in regions of certain outer walls of the liners.

It is a general objective of this invention to provide an improved forming method which overcomes the above-mentioned difficulties, and is useful in fabrication of plural-compartment cabinet liners, for either vertical or horizontal disposition.

SUMMARY OF THE INVENTION

In achievement of the foregoing as well as other objectives and advantages, the invention contemplates improvements both in a method of forming an article from a sheet of thermoplastic material, which article in preferred practice of the invention comprises a pair of adjacent walled structures, having unidirectionally presented openings. In accordance with the aforementioned preferred practice, the invention features provision of a pair of unidirectionally presented molds shaped in correspondence to the structures to be formed and so associated as to be movable between one position in which confronting walls thereof are closely spaced in accordance with the spacing of the structures to be formed, and another position in which said confronting walls are spaced apart a substantially greater distance than in said one position, wherein improvement resides in provision for: tilting said molds about an axis extending generally transversely of the direction of relative movement of said molds; movement of said molds to the mentioned other position in which the confronting walls of said molds are substantially spaced; extension of a unitary, softened sheet of thermoplastic material over said tilted and pivoted molds billowing of said softened sheet away from said molds; relative translation of said spaced-apart, tilted molds and said billowed sheet toward one another sufficient to engage the tilted and spaced-apart molds therewith while said sheet is engaged by an assist-plug to stretch the softened sheet over said molds; movement of said molds to horizontal non-tilted position and to said one position in which they are closely spaced; and utilization of differential fluid pressure to cause said softened sheet to conform to the surfaces of said molds in said one, closely spaced, non-tilted position.

Advantageously, the combined tilting and relative pivotation of the mold members ensures presence of ample material in regions of relatively deep draw, whereby there is achieved a molded article of substantially uniform wall thickness.

The manner in which the foregoing as well as other objectives and advantages of the invention may best be achieved will be more fully understood from a consideration of the following description, taken in light of the accompanying drawing:

DESCRIPTION OF THE PREFERRED PRACTICE AND APPARATUS

Figure 1:
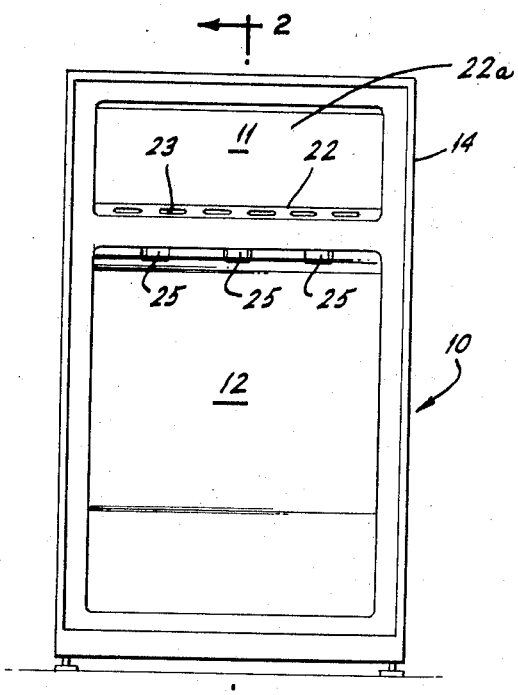
FIG. 1 is an elevational showing of refrigerator cabinet structure of a type embodying a pair of compartment liners made in accordance with the invention, and with the doors removed for convenience of illustration.
Figure 2:
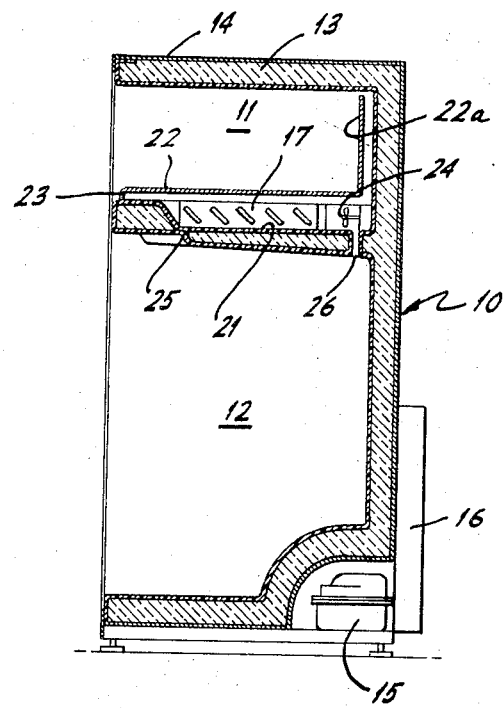
FIG. 2 is a sectional showing of the cabinet structure taken generally along the line indicated by arrows 2—2 applied to FIG. 1.

With reference to FIGS. 1 and 2, a refrigerator cabinet 10 includes a pair of compartments having unidirectionally presented openings, and defined by a pair of liner sections 11 and 12. The liner sections are made of a thermoplastic material, such as, for example, ABS resin, and are molded as an integral structure from a single flat sheet of such material, in accordance with the invention to be described in detail below. Thermal insulation designated generally by the numeral 13, and which may for example be of the foamed type, fills the spaces between the confronting walls of liner sections 11 and 12, and between the outer walls of the same sections and the walls of outer shell 14 of cabinet 10. It will be understood, of course, that other well-known, suitable types of thermal insulation may be used.

The refrigerating unit is conventional, comprising a compressor 15, condenser 16, and an evaporator 17 connected in the usual series flow circuit by suitable conduit means (not shown). Evaporator 17 is conveniently located in a recessed portion 21 of upper liner section 11, and a partition 22 includes a horizontal section that extends over the recess and the evaporator.

The hereinabove-identified copending application is directed to a novel method and apparatus for molding liner structure including an undercut section such as recessed portion 21. Further to the exemplary refrigerator construction, partition 22 is provided with front air passages 23, and a vertical section 22a of the partition is spaced from the top and rear walls of liner section 11 as shown. Air moved by a blower 24 disposed in the rear portion of recess 21 is caused to flow into the freezer storage compartment defined by liner section 11, through the space between the liner and partition 22a, thence returns to the region of evaporator 17 through front passages 23. The lower food storage compartment, defined by liner section 12, is cooled by air caused to move from the compartment through passages 25, over evaporator 17, thence back into the compartment through passages 26.

It will be appreciated that the invention to which the copending application is directed overcomes problems arising from: the characteristically close spacing between the above-described upper and lower lines sections 11 and 12, which heretofore has made it difficult to vacuum-form the confronting top and bottom walls of the liners, due particularly to the relatively small amount of thermoplastic material available in the blank sheets for the relatively deep draw required in this region; and the fact that the recessed portion 21 of the upper liner section 11 comprises an undercut section, making it difficult to provide mold structure from which the molded liners may be easily stripped.

It will be further appreciated that the present invention recognizes, and provides a solution to, problems associated with a scarcity of material for molding the top wall of liner section 11. Material is scarce in this region due to the relatively small projected area of the plastic sheet undergoing deep draw to form the freezer compartment liner section 11, as compared with the relatively large projected area undergoing the same depth of draw to form the food compartment liner section 12.

Figure 3:
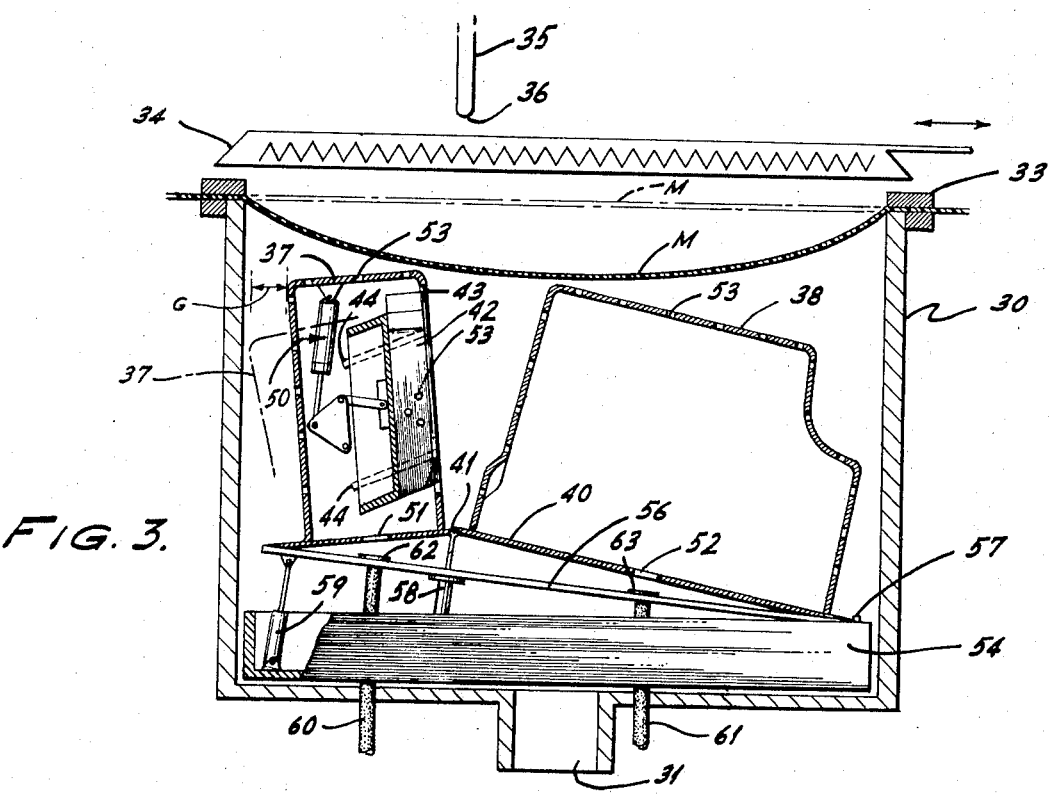
FIG. 3 is a sectional-elevational view, with some parts fragmented for convenience of illustration, of mold apparatus for fabricating the compartment liners of the cabinet seen in FIGS. 1 and 2, and further illustrating operational features of the apparatus contemplated by the invention; and, FIGS. 4 to 7 are further showings of a portion of the apparatus seen in FIG. 3, and illustrating further operational features thereof.

Turning now to apparatus for forming liners 11 and 12 in accordance with the invention, and first with reference to FIG. 3, an open top, generally box-shaped chamber 30 is ported, at 31, to suitable pressure producing mechanism of conventional design (not shown). A clamping ring 33 closely surrounds the upper rim of chamber 30, and is constructed and arranged to clamp in place a sheet of thermoplastic material M (broken line showning) that extends over the upper rim of chamber 30. A radiant heater 34 is arranged to overlie the sheet to heat the same, and is mounted for lateral movement (see horizontal arrows) between the illustrated extended position and a retracted position in which it is removed from above the sheet. An assist-plug 35 of generally rectangular shape is disposed above heater 34 and has a slightly rounded edge portion 36 as viewed in section. Relative movement between the plug and the mold is provided for by mounting both assist-plug 35 and the molds 37 and 38 for vertical movements, into and out of telescoping relationship, as will be described in detail. No specific apparatus for moving the assist-plug and molds has been shown, since this apparatus can be entirely conventional in nature.

Each of the adjacently positioned, generally unidirectionally presented molds 37 and 38 is shaped to yield the general box-shape of the inside surfaces of the respective liner sections 11 and 12 to be molded. Molds 37 and 38 are mounted along their base portions on articulated frame structure 40 hinged at 41 in the region of adjacency of the mold base portions. Use of two molds, and of hinged mold-supporting frame structrue, is in accordance with the hereinabove-identified copending application. In further accordance with the copending application, the left-hand, smaller molds 37 includes an auxiliary section 42 nested in mold 37 for selective extensible movement on runners 44 through opening 43 into the space between the molds 37 and 38, whereby in extended position it affords, together with mold 37, the desired shape of the smaller liner section 11 to be formed. Movements of auxiliary section 42 are afforded by a suitable pneumatic linkage of known type, and designated generally by the numeral 50. Frame structure 40 is suitably ported at 51 and 52, and molds 37, 38 and 42 are provided with large numbers of vents or ducts, of a type appearing on enlarged scale at 53.

In especial accordance with the present invention, frame structure 40 further is supported for both sliding and pivotal movements on a tilt table structure 56 carried by rectangular, box-shapped support frame 54. Tilt table structure 56 is tiltable on hinge 57 provided on frame 54, about an axis parallel to, and spaced from, the axis of pivotation of molds 37 and 38 on hinge 41. Support frame 54, along with the tilt table structure 56 and molds thereon, are elevatable from the position shown in FIG. 3 to the upper position shown in FIG. 7, for reasons to be more fully explained, in which upper position the level of the frame structure 40, and mold base portions thereon, are substantially at the level of the upper edge of chamber 30. For convenience of illustration molds 37 and 38 are shown in full lines in FIG. 3 in their upwardly pivoted and tilted positions. The lower, pivoted position of mold 37 is shown partly in broken lines, in order to illustrate advantages afforded by the invention arising from the lateral displacement G (FIG. 3) afforded by tilting of table structure 56, as will be explained in connection with operation of the apparatus.

The upwardly pivoted position of frame structure 40 is maintained by mechanism including pneumatic linkage means 59 carried by tilt table structure 56, and tilting of table structure 56 about its hinge 57 is provided by a pneumatic linkage means 58 on frame 54, both said linkage means being of well-known type. Support frame 54 further includes combination vacuum-pressure connections 60 and 61, of known type, for introducing, selectively, vacuum or pressure to the underside of molds 37 and 38, while in their non-pivoted, non-tilted positions. Conveniently, connections 60 and 61 comprise flexible hoses or lines extending in airtight relation through chamber 30 for connection to suitable pressure and vacuum-producing means of conventional design. It will be understood that the other known connection means may be provided to accommodate vertical movements of the molds in chamber 30. For example, connections utilizing telescoping fluid-tight couplings may be used, either singly or in combination with flexible lines. The upper ends of connections 60 and 61 terminate in sealing rings 62 and 63 provided in tilt table structure 56, which rings are positioned sealingly to engage respectively aligned ports 51 and 52 in frame structure 40 communicating with the hollow undersides of molds 37 and 38 (see FIG. 3).

In the formation of a pair of liners 11 and 12, and again with reference to FIG. 3, a sheet of thermoplastic material, shown in broken lines at M, is placed between assist-plug 35 and molds 37 and 38. The sheet of material is then heated, causing it to soften and sag to the position seen in full lines at M, while molds 37 and 38 are held in their non-pivoted, non-tilted positions (not shown) in which the confronting surfaces are more closely spaced. Table structure 56 is then tilted, and molds 37 and 38 are pivoted to their full-line positions.

Figure 4:
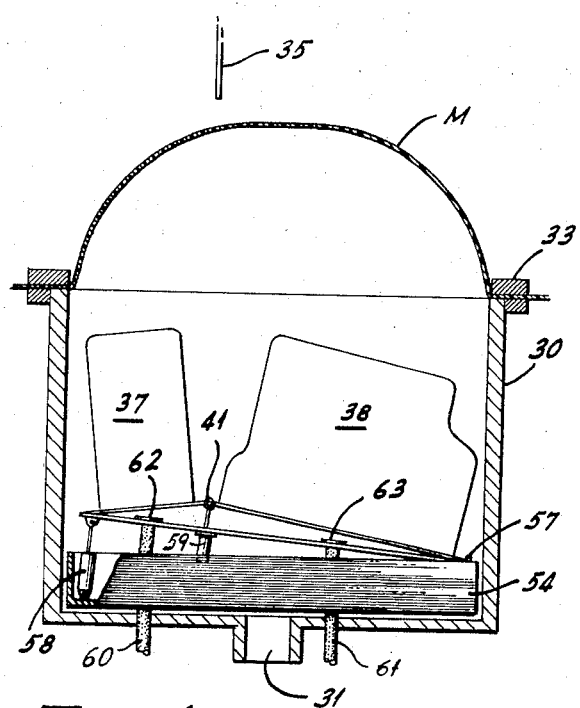

As is illustrated In FIG. 4, heater 34 is withdrawn, and the sagged sheet M is billowed upwardly to the position shown b application of slight, positive air pressure to chamber 30 by way of port 31 provided or that purpose. While the sheet M is in upwardly billowed position, table structure 56 is held in upwardly, tilted position, and molds are held in pivoted position in which their confronting surfaces are more widely spaced. At this stage, a further realization may be had of the gain in material M afforded by the displacement G referred to in connection with the description of FIG. 3. It is this gain in material that ensures adequate wall thickness in the corresponding corner region of the molded article as previously described.

Figure 5:
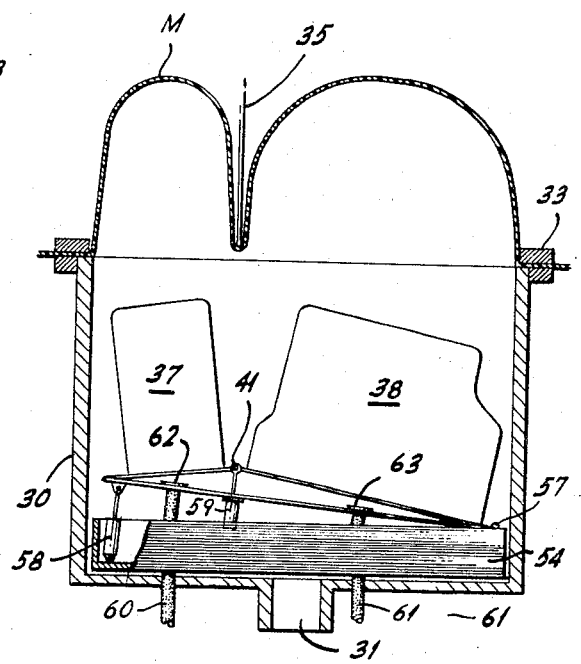
Figure 6:
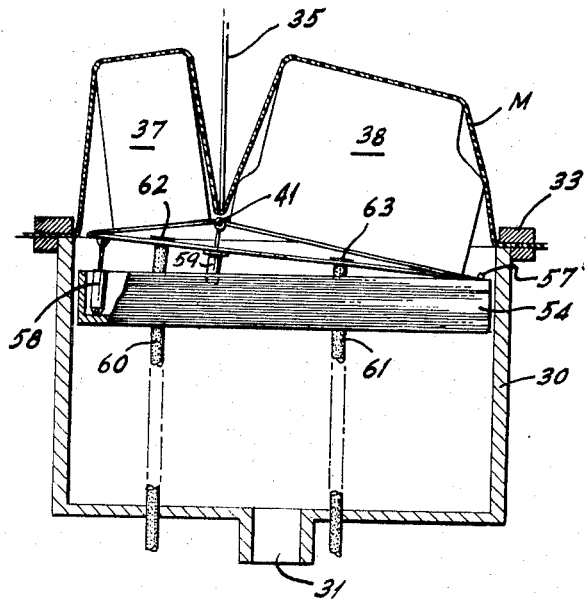

Now with reference to FIG. 5, assist-plug 35 is moved downwardly to engage billowed sheet M, forming a pair of individual, symmetrically billowed portions, each opposite a corresponding mold 37 and 38. Support frame 54 is then elevated to move molds 37 and 38 toward the billowed, heat-softened sheet M, as seen in FIG. 6, to engage the sheet and thereafter to urge it onto both molds 37 and 38, while auxiliary mold section 42 is held in its retracted position.

Figure 7:
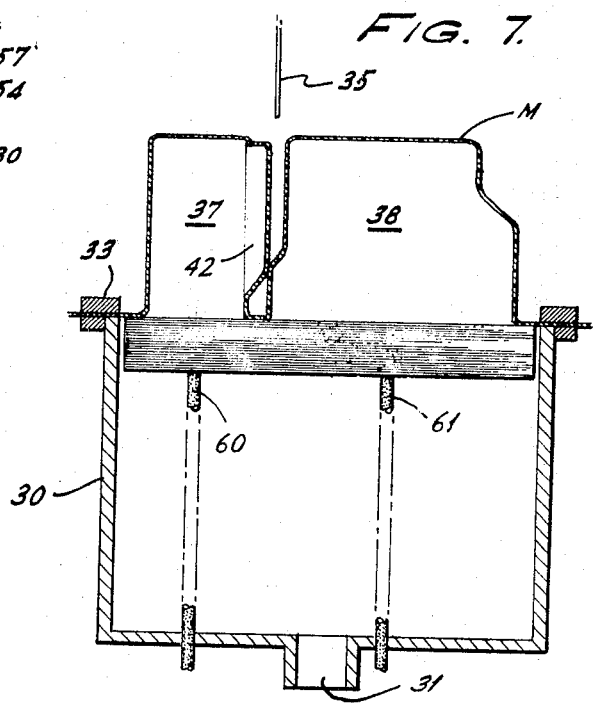

This movement is then followed by continued elevation of support frame 54, and movement of molds 37 and 38 to non-pivoted, non-tilted, liner-forming position by operation of corresponding linkages 58 and 59, in which position the confronting surfaces of molds 37 and 38 are relatively closely spaced, as is seen in FIG. 7, and sealing rings 62 and 63 sealingly engage aligned ports 51 and 52 (FIG. 3). Upon this and the ensuing movements for the final stages of the molding operation, there are realized the advantages afforded by the gain of extra material both between molds 37 and 38, and at the upper left edge of mold 37.

With further reference to FIG. 7, assist-plug 35 is retracted to its upper position, a vacuum is created first in right-hand mold 38 through connection 61, and air entrapped between the heated sheet and right-hand mold 38 is removed through the large number of vents or ports 53 in the walls thereof, causing the right-hand sheet portion to conform to the mold 38 and form the desired liner section 12, and mold 38 as shown. Immediately, and still with reference to FIG. 7, the auxiliary section 42 of mold 37 is projected to its extended position by pneumatic linkage 50. While auxiliary section 42 is held in its extended position, air entrapped between the heated sheet and mold 37, and its auxiliary section 42, is evacuated through connection 60 to form the desired liner section 11 and its undercut region 21 (FIG. 2). Liner sections 11 and 12 are then cooled, the extended auxiliary mold section 42 is retracted from the undercut region of liner section 11, and the integrally-formed liner sections are ready for stripping from the molds. formation of communicating passages between the upper an lower refrigerator compartments, examples of such passages being the air passages 25 and 26 seen in FIGS. 1 and 2, is provided, prior to stripping of the liners and according to the method disclosed and claimed in copending application of John A. Scarlett, Ser. No. 311,722 filed Dec. 7, 1972, now U.S. Pat. No. 3,834,177 and assigned to the assignee of the present invention.

While the invention has been described in connection with the formation of refrigerator compartment liners, it will be understood that the invention as claimed contemplates the formation of compartmented structures, generally. Also, it will be understood that pressurized equipment may be used in place of the vacuum apparatus as shown and described for the application of differential fluid pressure to the softened thermoplastic sheet.

I claim:

1. In a method of forming an article, comprising a pair of adjacent walled structures having unidirectionally presented openings, from a sheet of thermoplastic material, utilizing a pair of unidirectionally presented molds shaped in correspondence to the structures to be formed and so associated as to be movable on table structure between one position in which confronting walls thereof are closely spaced in accordance with the spacing of the structures to be formed and another position in which said confronting walls are spaced apart a substantially greater distance than in said one position, the steps which comprise: suspending a unitary, softened sheet of thermoplastic material over said molds, restraining at least one edge of said sheet, tilting said table structure about an axis extending transversely of the direction of relative movement of said molds and parallel to and spaced from said restrained edge thereby to increase the spacing between said restrained edge of said sheet and a confronting portion of one of said molds as said molds are moved into contact with said sheet; moving said molds to the mentioned other position in which the confronting walls of said molds are substantially spaced apart; causing said softened sheet to billow away from said molds; relatively translating said molds and said billowed sheet toward one another sufficient to engage the tilted and spaced apart molds therewith; moving said molds to horizontal non-tilted position and to said one position in which they are closely spaced, and engaging said sheet with an assist-plug to stretch the softened sheet over said molds; and utilizing differential fluid pressure to cause said softened sheet to conform to the surface of said molds in said one, closely spaced position.

2. The method according to claim 1, and characterized in that said molds are moved pivotally between recited positions thereof, and further in that the axis of pivotation is substantially parallel to the axis of tilting of said table structure.

3. The method according to claim 1, and further characterized in that said assist-plug engages said billowed sheet prior to engagement of the sheet by said tilted and spaced-apart molds.

4. the method according to claim 1, and characterized in that the projected area on the billowed sheet of the one of the recited, tilted and spaced-apart molds which is closer to said sheet than the other of said molds after said table structure is tilted is less than the projected area on said billowed sheet of the other one of said molds, the depth of draw onto each said molds being substantially in the same amount.

* * * * *